Patented Feb. 12, 1952

2,585,483

UNITED STATES PATENT OFFICE 2,585,483

PRODUCTION OF ETHYLENE OXIDE

Frank Clifford Mawer, Blackley, Manchester, England, assignor to Imperial Chemical Industries Limited, a corporation of Great Britain No Drawing. Application January 3, 1950, Serial No. 136,653. In Great Britain January 13, 1949

4 Claims. (Cl. 260—348.5)

This invention relates to the production of ethylene oxide.

It has already been proposed to produce ethylene oxide by the reaction of ethylene with an oxygen-containing gas in the presence of a catalyst containing silver, the temperature being in the range of from 150° to 400° C.

We have now found that in such a process improved results are obtained if the reaction is carried out in the presence of silver-containing catalysts which also contain fused sodium aluminium silicate.

According to the present invention therefore, there is provided a process for the production of ethylene oxide which comprises reacting in the vapour phase and at elevated temperature ethylene and an oxygen-containing gas in the presence of a silver-containing catalyst which also contains fused sodium aluminium silicate. Preferably the catalyst is a reduced silver oxide.

In this specification the term "fused sodium aluminium silicate" is to be understood to mean fused, semi-fused or sintered materials containing predominantly the oxides of sodium, aluminium and silicon over a wide range of proportions. Satisfactory results according to the present invention have been obtained by the use of fused sodium aluminium silicates in which the molecular proportions of the oxides of aluminium, silicon and sodium were within the range: 1 $Al_2O_3$, 2 to 6 $SiO_2$, from 0.5 to 3 $Na_2O$. It should be understood that other proportions may be used as desired.

The fused sodium aluminium silicate for use according to the present invention may be produced by a variety of methods. In general a suitable fused sodium aluminium silicate may be obtained by subjecting to a high temperature a mixture of the oxides of sodium, aluminium and silicon in the desired proportions. Alternatively compounds giving rise to the oxides under the conditions of heating may be used in the preparation of the fused sodium aluminium silicate, for example the oxides of sodium and silicon, or a part thereof may be obtained by the use of a sodium silicate, such as the metasilicate. Suitable temperature for the production of the fused sodium aluminium silicate are within the range of 800° C. to 1500° C.

The fused sodium aluminium silicate may form the support for the silver-containing catalyst or the catalyst may be used unsupported or supported on some other material, for example firebrick, or similar siliceous material, preferably having a particle size in the range $\frac{1}{16}$" to $\frac{1}{2}$".

In the second and third cases, in order to give the required activity and specificity it is desirable that the fused sodium aluminium silicate which is preferably in powder form, should be present in a proportion of from 0.5 to 50% and preferably 0.5 to 10% by weight of the active ingredient calculated as silver oxide ($Ag_2O$). In the first mentioned case the fused sodium aluminium silicate may or may not be introduced in the active layer, but is preferably present there also.

The process may be carried out within a wide range of temperature, for example between 150° and 400° C. In general increase in temperature is accompanied by an increase in the conversion of ethylene and a decrease in the yield of ethylene oxide. It is preferred to carry out the reaction in the temperature range of 200° to 300° C.

If desired the process may be carried out at elevated pressure, for example up to 50 atmospheres gauge, although satisfactory results have been obtained at atmospheric pressure. If superatmospheric pressure is used it is preferred to employ less than 20 atmospheres gauge.

It is convenient to use air as the oxygen-containing gas, but a reaction mixture containing concentrations of oxygen other than that given by the addition of air to the ethylene to be reacted may be used, for example inert gaseous diluents such as nitrogen may be provided in the reaction mixture. The proportion of ethylene in the initial gaseous reaction mixture may be within a wide range: satisfactory results have been obtained at moderate pressures with mixtures containing up to 20% by volume of ethylene. Similarly, the proportion of oxygen in the reaction mixture may be in a wide range, proportions up to 20% by volume having given satisfactory results. It is desirable to exercise careful control of temperature when using reactant mixtures having a composition falling within the explosive range. It is preferred to use an oxygen/ethylene molar ratio at least equal to 1.0.

Improved results are obtained by dispersing or pasting the catalyst with an organic liquid such as methanol and preferably with acetone. In starting up, a suitable procedure is to charge the reactor with catalyst still wet with acetone, and to pass air, an inert gas, or the reaction mixture itself, through the catalyst and then to pass the reaction mixture through, and maintain the temperature within the desired range.

Catalysts suitable for use according to the process of the present invention may be prepared by a variety of methods depending for example, on whether silver carried on an inert support or on fused sodium aluminum silicate is to be used.

Example 1

A fused sodium aluminium silicate was prepared by heating, in a fireclay crucible and at a temperature of about 1300° to 1400° C., a mixture of 122 gms. sodium metasilicate, 102 gms. of alumina and 180 gms. of silica. After heating for about four hours the crucible was cooled, the vitreous silicate mass chipped out and was ground to pass through a 30 mesh British fine mesh sieve, i. e. having apertures of 0.50 mm.

Two parts by weight of this ground material and 20 parts by weight of silver oxide were mixed to a thin paste with 25 parts by weight of acetone. 78 parts by weight of firebrick granules (3.0 to 6.0 mm. grain size) were added and the mixture stirred while the acetone was allowed to evaporate. The granules were then charged into a reaction chamber and the residual acetone removed from the granules by passing air through the chamber at a temperature of about 100° C.

An ethylene/air mixture containing 10% by volume of ethylene freed from catalyst poisons by passage through a bed of active carbon was passed at a rate of 10 litres per hour (measured at N. T. P.) through a 40 cm. bed of catalyst, prepared as above described and contained in a 1 cm. diameter hard glass tube, which was immersed in an oil bath maintained initially at 270° C. Under these conditions the efficiency of the catalyst gradually increased and reached a maximum, as shown by the attainment of substantially complete conversion of the ethylene and a yield of 60% to 64% of ethylene oxide. While continuing operation, the temperature of operation was gradually decreased, to maintain optimum catalyst performance and after about 1000 hours stable conditions were attained, the temperature then being between 230° and 240° C. With continued operation, substantially no deterioration in the efficiency of the process was observed after about 4000 hours.

Example 2

A catalyst prepared as described in Example 1 was packed in a silver tube of ½" internal diameter to give a bed of catalyst six feet long. When operating with the temperature maintained at 275° C. and using a gas mixture of the same composition as in Example 1, 97% of the initial ethylene was converted, giving a yield of ethylene oxide of 57%. In this example, the velocity was 500 volumes of gaseous feed (measured at N. T. P.) per volume of catalyst space per hour.

Examples 3 and 4 which follow, illustrate advantages obtained by working according to the present invention.

Example 3

A catalyst was prepared by mixing 20 parts by weight of silver oxide, with acetone sufficient to give a thin paste, 78 parts by weight of firebrick granules (3.0 to 6.0 mm. grain size) were added and the mixture stirred while the acetone was allowed to evaporate. The granules were then charged into a reaction chamber and the residual acetone removed from the granules by passing air through the chamber at a temperature of about 100° C.

A gaseous mixture containing by volume 2½% of ethylene, 10% of oxygen and 87½% of nitrogen was passed through the reaction chamber at atmospheric pressure at a rate of 250 volumes measured at N. T. P., of gas per volume of bulk catalyst space per hour, the catalyst being maintained at a temperature of 230° C. When steady conditions prevailed, the conversion of ethylene was 52% and the yield of ethylene oxide 65%.

Example 4

The experiment of Example 3 was repeated, except that a catalyst prepared as described in Example 1 was used, when it was found that the conversion of ethylene was 95% and the yield of ethylene oxide 64%.

In this specification the term "conversion" refers to the percentage of the ethylene which is destroyed on passing through the reaction chamber, while the yield refers to the percentage of the destroyed ethylene which appears in the product as ethylene oxide.

1. A process for the production of ethylene oxide which comprises reacting in the vapor phase at a temperature of 150 to 400° C. a mixture of ethylene and an oxygen containing gas in which the proportion by volume of ethylene is up to 20% and of oxygen up to 20%, the molar ratio of oxygen to ethylene being at least 1:1, in the presence of a catalyst comprising separately prepared silver oxide in intimate admixture with from 0.5 to 50% of its own weight of fused sodium aluminum silicate, said sodium aluminum silicate having silica and sodium oxide in proportion of from 2 to 6 mols, and from 0.5 to 3 mols, respectively, per mol of alumina.

2. A process as defined in claim 1, wherein the catalyst is supported on a carrier.

3. A process as defined in claim 1, wherein the catalyst is unsupported by other material.

4. A process as defined in claim 1, wherein the temperature is maintained within the range 200 to 300° C.

FRANK CLIFFORD MAWER.

REFERENCES CITED

The following references are of record in the file of this patent:

UNITED STATES PATENTS

| Number | Name | Date |
|---|---|---|
| 1,930,503 | Behrman | Oct. 17, 1933 |
| 2,279,470 | Law | Apr. 14, 1942 |
| 2,424,083 | Finch | July 15, 1947 |

FOREIGN PATENTS

| Number | Country | Date |
|---|---|---|
| 503,052 | Great Britain | 1939 |

OTHER REFERENCES

Hachk's "Chemical Dictionary," p. 921, 3rd edition, 1944.